United States Patent [19]

Szentesi

[11] Patent Number: 4,699,460
[45] Date of Patent: Oct. 13, 1987

[54] METHOD AND APPARATUS FOR REPAIRING FIBER OPTIC CABLE

[75] Inventor: Otto I. Szentesi, Hickory, N.C.

[73] Assignee: Siecor Corporation, Hickory, N.C.

[21] Appl. No.: 399,495

[22] Filed: Jul. 19, 1982

[51] Int. Cl.[4] ............................................. G02B 6/38
[52] U.S. Cl. ............................................. 350/96.21
[58] Field of Search ................ 350/96.20, 96.21, 96.22

[56] References Cited

U.S. PATENT DOCUMENTS

| 4,192,056 | 3/1980  | Logan et al.    | 350/96.21 |
| 4,359,262 | 11/1982 | Dolan           | 350/96.20 |
| 4,428,645 | 1/1984  | Korbelak et al. | 350/96.20 |

FOREIGN PATENT DOCUMENTS 0077115  6/1982  European Pat. Off. ......... 350/96.23

Primary Examiner—William L. Sikes
Assistant Examiner—Robert E. Wise
Attorney, Agent, or Firm—Roy B. Moffitt

[57] ABSTRACT

Disclosed is a method and apparatus for quickly joining one set of optical fibers to another set followed by permanent repair. The basic apparatus comprises two frames, each having a cross member containing a plurality of spaced apart optical fiber connectors; optical fibers optically connecting one connector in one frame to a corresponding connector in the other frame; at least one means in each frame to anchor a cable to the frame; and a bracket means attached to each frame between that frame's connectors and anchor means. A bare fiber adapter is also disclosed adapted to removably receive an optical fiber coaxially. On one end of the bare fiber adapter is a means affixed thereto for removably securing an optical fiber within the adapter.

The repair method of a severed fiber optic cable involves the use of the above described apparatus as follows:

Cable ends to be joined are stripped and secured in each frame. Bare fiber adapters are then removably secured to the terminal portions of the optical fibers of both cable ends sought to be optically connected to one another. Thereafter, the bare fiber adapters of one cable end are connected to the connectors of one frame and a like procedure carried out with the bare fiber adapters of the other cable end and frame to restore optical communication. After first routing traffic over other fibers, bare fiber adapters of a given fiber are removed and the fibers optically joined together in a more permanent fashion. When there is not enough slack in the damaged cable to join the fibers directly, a piece of spare cable has to be stripped and adhered to the frames to carry out permanent joining. Subsequently, the bare fiber adapters of the corresponding fiber sought to be permanently connected are removed and the fibers are permanently joined to each other in a predetermined manner.

20 Claims, 7 Drawing Figures

METHOD AND APPARATUS FOR REPAIRING FIBER OPTIC CABLE

BRIEF SUMMARY OF THE INVENTION

Fiber optic cable is being used more and more in today's telecommunications systems. One of the many reasons for this is that optical fibers are small, when compared to insulated copper wire conductors, and they are capable of simultaneously carrying many thousands of telephone calls (traffic) over a single fiber. Metallic conductors of the same physical size can carry only a very small fraction of that number. When a fiber optic cable is cut or broken, accidentally or otherwise, its inherent high capacity is disadvantage and not necessarily a blessing, because of the extremely large amount of telephone traffic either disrupted or completely lost. Consequently, service over a fiber optic cable must be restored as soon as possible, even if the restoration is only temporary, so as to minimize telephone company lost revenue and customer irritation. Furthermore, the subsequent permanent repair must be accomplished one fiber at a time in order that traffic over the other temporarily connected fibers is not affected. It is towards this end that the disclosed invention is directed.

The invention contemplates a kit or device to be used by a telephone repair personnel in the field. When a fiber optic cable is cut, broken or otherwise damaged, traffic over the damaged fibers is disrupted. If there are undamaged fibers in the cable, then it is obvious that traffic can be diverted to those fibers while the repair of the broken fibers takes place. On the other hand, as is more often the case, all or most of all of the fibers are damaged and it is imperative that some kind of service or repair be accomplished immediately so that traffic will not be lost and customer relations maintained. In most instances there is not sufficient slack in the severed cable to directly join the fibers and a length of spare cable has to be inserted.

The apparatus of the invention comprises two frames, each containing a cross member on which there is mounted a corresponding plurality of spaced apart optical fiber connectors. Each optical fiber connector of one frame is optically connected to a corresponding optical fiber connector of the second frame by means of an optical fiber terminated in the connectors. Each frame contains at least one anchoring means (usually two) for anchoring cable to the frame. Between the anchoring means and the optical fiber connectors of each frame is a bracket means. A bare fiber adapter is used in connection with the device consisting of a shell, an alignment tube adapted to receive an optical fiber and a means to removably secure an optical fiber coaxially received therein. The alignment tube is coaxially received in the shell and a portion of its length is spaced apart from the shell to form an annulus on one end and on the other end is the means for removably securing an optical fiber.

Repairing a broken, cut or otherwise damaged optical fiber cable involves the following steps: the above described apparatus is provided, cable ends are stripped and anchored to the device, and after a fiber end preparation process is applied to the terminal free ends of a first set of optical fibers of a cable end sought to be connected to a second set of optical fibers of another cable end, bare fiber adapters are then secured to such prepared fibers. The bare fiber adapters of the first set of optical fibers are coaxially aligned with the optical fiber connectors of the first frame and each adapter-connector combination is secured together by means of a sleeve. The process is repeated using the second frame and the second set of optical fibers of the second cable end. The coaxial connection of the bare fiber adapters and the optical fiber connectors results in an optical path between such optical fibers.

After the damaged fiber optical cable has been temporarily repaired, telephone traffic can be resumed over any of the fibers so restored. Such a "quick-fix" is obviously temporary, but can be relied upon and used for days, sometimes weeks, with no appreciable or significant deterioration to the service, thus providing time and opportunity for the repair personnel of a telephone company to secure and apply apparatus adapted to affix the fiber optic ends of the first cable to the corresponding fiber optic ends of the second cable end in a more permanent fashion. There are many ways taught by the prior art for permanently joining one fiber end to another and because they do not form a portion of the instant invention, they will not be described. See, for example, "A Procedure for Splicing Optical Waveguides," Application Note No. 6, Corning Glass Works, Tele-communications Products Department, Corning, N.Y.

After obtaining the permanent repair apparatus and locating it on the site of the cable break, traffic on one selected fiber can be directed to another fiber or fibers, the bare fiber adapters removed, and such fiber ends then placed in the permanent repair apparatus and permanently joined one to another as more fully described hereafter. Thereafter, the traffic previously existing on that fiber can be restored and the remaining fibers treated in the same manner.

BRIEF DESCRIPTION OF THE DRAWINGS

FIG. 6 is also an exploded view of two bare fiber adapters connected together by sleeve member 25 as shown schematically in FIG. 7.

DETAILED DESCRIPTION OF THE INVENTION

Figure 1:
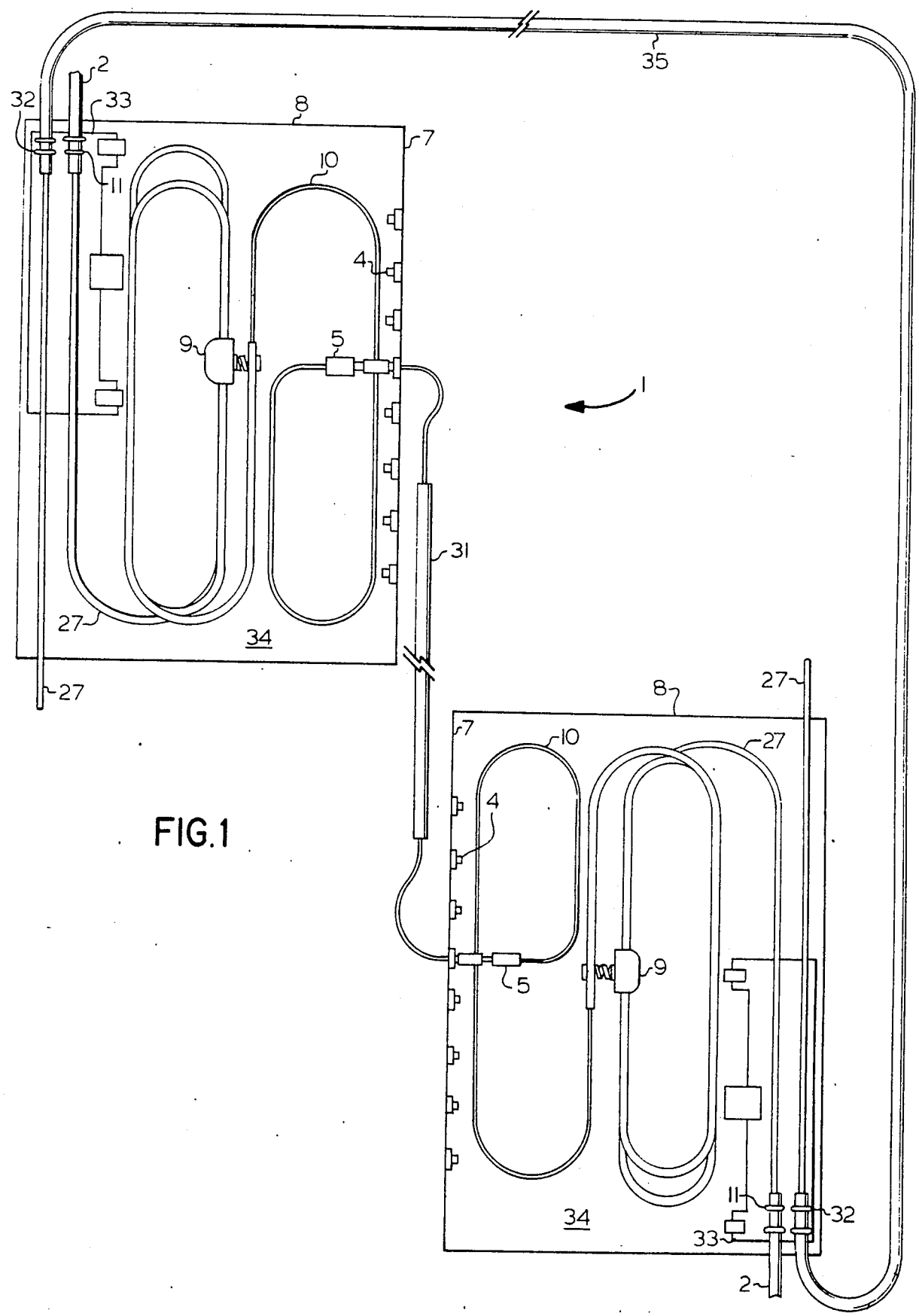
FIG. 1 is a plan view of the apparatus used to join the ends of a first set of optical fibers of one fiber optic cable end to a second set of optical fibers of another fiber optic cable end.

Shown in FIG. 1 by element 1 is the apparatus used in practicing the invention. Fiber optic cable ends 2 contain a plurality of optical fibers 10 which may be loosely or tightly disposed in one or more plastic tubes 27. The device works equally well with optical fibers bundled into a cable employing no tubes at all. For purposes of description, fiber optic cable 2 is assumed to have been severed, either intentionally or accidentally, producing the two cable ends as shown and to contain at least one tube in which there is disposed at least one optical fiber. The optical fibers of the left hand portion of cable 2 are sought to be optically connected to the optical fibers of the same cable 2 on the right hand side of FIG. 1.

Figure 2:
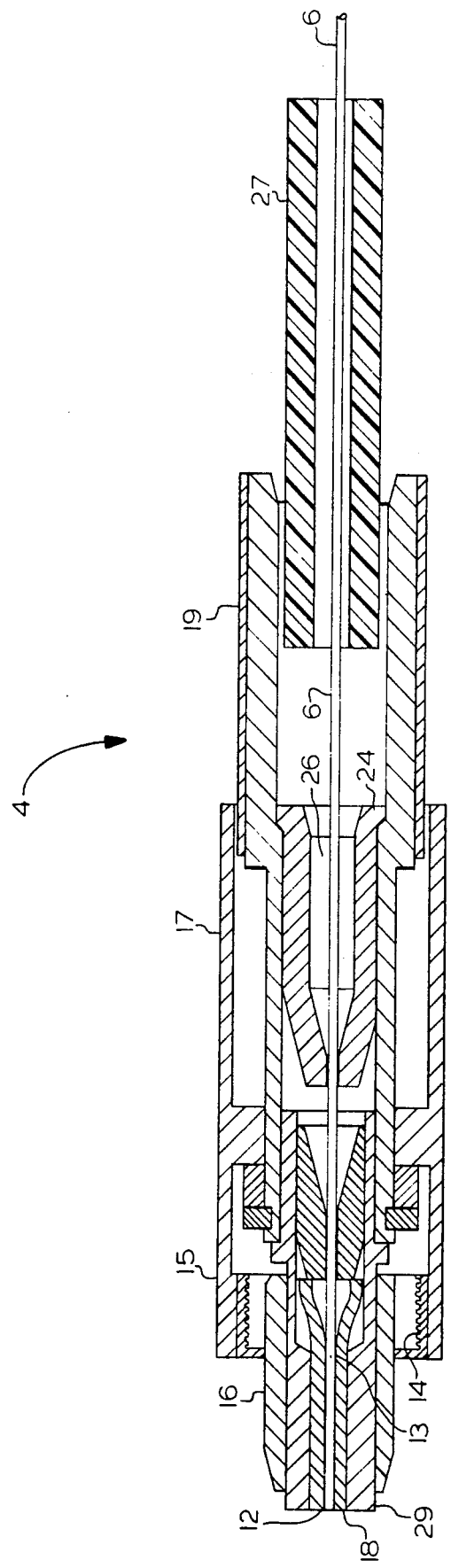
FIG. 2 is a cross sectional view of an optical fiber connector means, schematically shown in FIG. 1.
Figure 3:
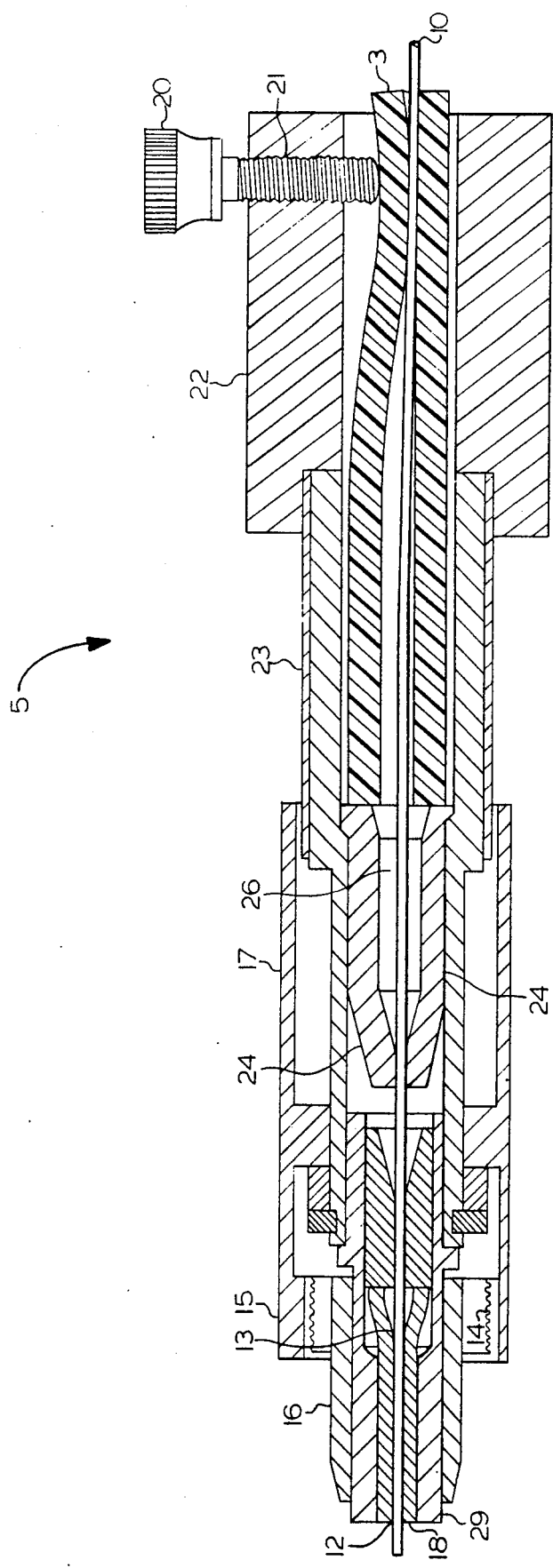
FIG. 3 is a cross sectional view of a bare fiber connector schematically shown in FIG. 1, in a state prior to its being connected to an optical fiber connector.

To practice the invention, one of the cable ends 2 is secured in cable anchoring means 11 of frame 8 and plastic tube 27 is exposed for a length sufficient to secure it in bracket 9. For purposes of illustration, only one plastic tube 27 is shown in FIG. 2. A portion of the plastic tube 27 protruding beyond bracket 9 is stripped away leaving coated optical fiber 10 exposed. Generally speaking, tele-communications or data carrying optical fibers are coated (buffered) on their outer periphery with a very thin film of plastic material such as an acrylate and this must be removed prior to inserting the terminal free end of a buffered optical fiber into a bare fiber adapter 5. This is easily achieved, as is well known in the prior art, by inserting a terminal portion of an optical fiber into methylene chloride. Once the buffer layer has been removed, the fiber end is prepared by well known techniques(*) so that the fiber end is smooth and perpendicular to the fiber axis. A bare fiber adapter 5 is then fitted on a terminal end of the optical fiber end in the manner as shown in FIG. 3, which will be described later. At this juncture, it is suffice to note that the terminal portion of optical fiber 10 is removably positioned and coaxially received inside of bare fiber adapter 5 in the manner shown in FIG. 3.

*Gloge, P. W. Smith, D. L. Bisbee, and E. L. Chinnock, "Optical Fiber End Preparation for Low-Logs Splices," B. S. T. J., 52, No. 9 (November 1973), pp. 1579-1588.

As shown by FIG. 1 the device or kit used in the practice of this invention involves frames 8 each having cross members 7, cable anchoring means 11 and 32, mounting means 33, bracket means 9 and a plurality of optical fiber connector means 4 spaced apart from one another positioned on cross member 7. One of the frames 8 has a means of storing cable 31 (not shown). Each pair* member of optical fiber connector means 4 has an optical fiber 6 fixedly terminated therein in the manner as shown in FIG. 2 thus providing an optical path between an optical connector pair member on the left hand portion of cross member 7 and a corresponding optical connector pair member on the cross member on the right hand side of the device. It will be noted that the device is bilaterally symmetrical, each side of the device having cable anchoring means 11 and 32, bracket means 9, mounting means 33, and a cross member 7 containing a plurality of spaced apart optical fiber connectors 4 positioned thereon. Optical fibers 6 either loosely or tightly disposed in tubes 30 or otherwise bundled into cable 31 connect pairs of optical fiber connectors. Cable 31 should be long enough to span the damaged portion of the cable. Typically this length is 100 feet, but can be several hundred feet. Cable anchoring means 11 and 32 are fixedly secured to mounting means 33 which is removably fixed to the bottom 34 of frame 8. Mounting means 33 may be used as a means of organization and storage of the permanent splices and is or can be part of the final or permanent closure. The purpose for such an arrangement will be described later.

*The word pair means an optical fiber connector means on one cross member 7 and a corresponding optical fiber connector means on the other cross member.

Element 32 is a cable anchoring means like element 11 and is used to secure to frame 8 a predetermined length of fiber optic cable for use in the procedure to permanently repair the damaged cable in the event that there is not enough slack in the damaged cable to bridge the gap caused by the damaged portion.

FIG. 2 is a cross sectional view of optical fiber connector means 4 in which there is fixedly disposed optical fiber 6 and a plastic tube 27 in which optical fiber 6 is loosely contained. The connector itself is basically composed of shell 17, in which there is coaxially disposed a connector backshell 19, alignment tube 16 coaxially received in shell 17, capillary tube 18 coaxially received in alignment tube 16, and sleeve 29. That portion of fiber 6 between points 12 and 13 is fixedly secured to capillary tube 18 by means of an epoxy glue or some other appropriate adhesive. It will be noted that a portion of alignment tube 16, sleeve 29 and capillary tube 18 protrude beyond the terminal free edge of shell 17 and is spaced apart from a portion of shell 17 in such a manner to form annulus 15, containing on its innermost surface threads 14. Annulus 15 is used to receivably and coaxially engaged sleeve member 25, which may be threaded on its outermost surface. The terminal free edge of optical fiber 6 of optical fiber connector means 4 is usually flush with the terminal free edge of capillary tube 18. Connector 4 also contains accumulation chamber 26 formed by sleeve 24.

Bare fiber adapter 5 contains essentially all of the same elements as optical fiber connector 4, apart from elements 3, 10, 20, 21, and 22. Optical fiber 10 is the optical fiber of cable ends 2. It, in its bare state, is inserted into the plastic tube 3 of bare fiber adapter 5 in the manner as shown in FIG. 3 and the optical fiber itself is terminated so that a small portion of it protrudes beyond the terminal free edge of capillary 18, contrary to the flush manner of fiber 6 of connector means 4. Furthermore, optical fiber 10 is not glued or otherwise fixedly adhered to any portion of the bare fiber adapter except by means shown by elements 3, 20, 21, and 22. Adapter sleeve 22 is a sleeve member in which there is threadably engaged a clamping screw made up of a head 20 and shank 21. In use, shank 21 is threadably advanced until it engages and compresses plastic tube 3 against optical fiber 10 and thus against bare fiber adapter sleeve 22 to removably secure optical fiber 10 inside of bare fiber adapter 5. Plastic tube 3 is made from any suitable soft plastic appropriate to cushion optical fiber 10 from shank 21. It is not a part of tube 27. A rubber or plastic strip (not shown) folded to surround fiber 10 may be used in place of tube 3.

Figure 4:
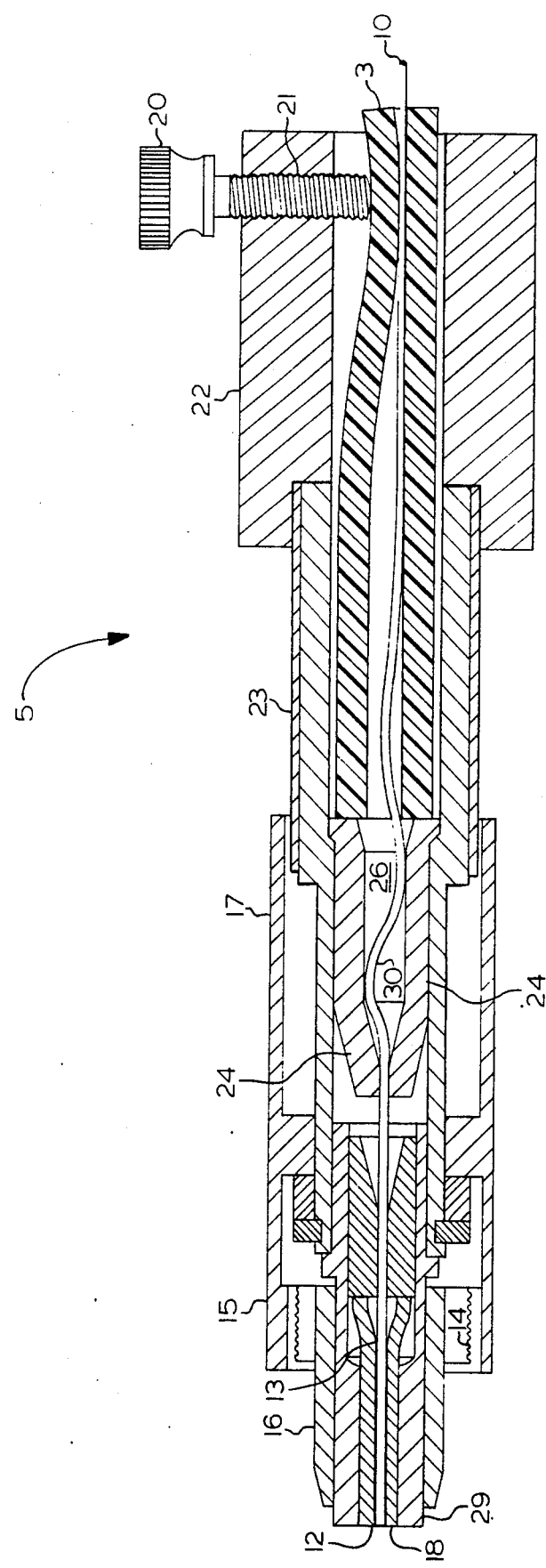
FIG. 4 is a cross sectional view of a bare fiber connector schematically shown in FIG. 1, in a state connected to an optical fiber connector.
Figure 5:
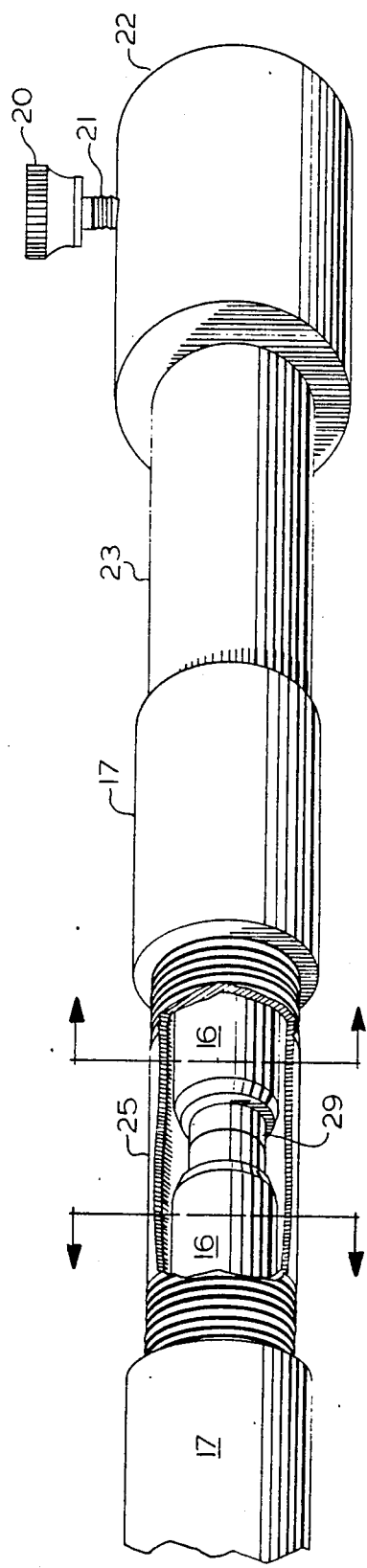
FIG. 5 is a partial cross sectional view of an optical fiber connector of FIG. 2 coaxially joined to a bare fiber connector of FIG. 3 or a bare fiber connector connected to another bare fiber connector.

Joining of bare fiber adapter 5 to connector 4 is done as shown by FIG. 5, and is achieved by threadably securing sleeve 25 in annulus 15 to both the connector 4 and adapter 5. Bare fiber adapter 5 and optical fiber connector means 4 joined by sleeve 25 coaxially aligns and mechanically connects tubes 16, sleeves 29, capillaries 18 and optical fiber 10 to optical fiber 6. Since optical fiber 6 of optical connector 4 cannot move, it is fixedly secured in the terminal portion (capillary tube 18) of connector means 4, the protruding portion of optical fiber 10 is pushed back by optical fiber 6 thereby causing optical fiber 10 to slightly bend in an undulating manner. See element 30, FIG. 4. Such bending is accommodated by accumulation chamber 26 formed by chamber sleeve 24. This occurs because optical fiber 10 is secured to bare fiber adapter only in the position where clamping screw shank 21 is positioned, i.e., at the rear portion of the adapter. Optical fiber 10 is in a snug but axially slidable relationship with capillary 18 whereas optical fiber 6 of the fiber optical connector means 4 is fixedly secured and immovable inside of capillary tube 18.

One method employed using above-described apparatus is as follows: Cable ends 2 are stripped to expose approximately 40 to 50 centimeters (15 to 20 inches) of tubes 27. Care should be used to prevent small pieces of the glass fiber from lodging in eyes or skin of the person working with the device. Such is accomplished by a meticulous reclaiming of all pieces of any broken fiber, placing them on a piece of adhesive tape and then disposing the tape in a safe manner. Furthermore, precaution should be used to keep all connectors 4 and adapters 5 free of dirt, lint or other foreign objects.

The ends of cable 2 should be secured to cable clamp 11 as shown in FIG. 2 and tubes 27 fastened by clamp 9 so that they are exposed and allowed to remove freely. Once a fiber sought to be terminated is identified, the tube around it is removed to expose at least a 30 centimeters (12 inches) of fiber 10. Using a soft tissue soaked in suitable solvent, optical fiber 10 is cleansed of any filling compound used in the cable. Thereafter, fiber 10 is stripped of any plastic coating thereon by immersion in a suitable solvent, e.g., methylene chloride, for a period of at least one minute to a depth of about 5 to 6 centimeters (2 to 2.4 inches) or by prior art mechanical means. Upon removal of the fiber from the methylene chloride, fiber 10 is cleaned with a tissue and then cleaned again with a tissue soaked in acetone.

The thus cleaned fiber terminal portion is first cut with a fiber cutter and then inserted into the open end of a bare fiber adapter 5 until fiber 10 projects about 0.5 mm (0.020 inches), see element 28, from the polished end. Using the knurled knob 20, optical fiber 10 is locked into place by means of rotating shaft 21, causing the sidewall of tube 3 to mechanically engage optical fiber 10 in the manner as shown in FIG. 4. Thereafter, bare fiber adapter 5 is mated to optical fiber connector 4 in the previously described manner and as shown in FIG. 4.

Sleeve 25 can be a metal or plastic tube, threaded on its outermost surface; however, such can be a plastic tube without threads as long as the snugness of tube 25 is sufficient to hold bare fiber adapter 5 in an abutting and coaxial aligned relationship with optical fiber connector 4 as shown in FIG. 5.

Using the device and method set forth above, one can readily appreciate that a quick and mechanical repair of the optical fibers in a fiber optic cable can be achieved in a relatively short time. Each broken fiber of broken cable ends is terminated with a bare fiber adapter as previously described and then mechanically secured to an optical cable connector means mounted on cross a member. Joining of elements 4 and 5 results in an optical path between fibers 10 and 6 on one side of the device and between 6 and 10 on the other side of the device. This path has an attenuation to transmitted light small enough for a temporary connection. After a fiber of a given cable is connected, traffic can be restored to this fiber. After the restoration of traffic, other devices well known in the prior art can be assembled at the situs of the cable break to repair the broken optical fibers in a more permanent manner; e.g., gluing fibers together with an epoxy, fusion splicing or the like. A closure means can then be disposed around the break point and the cable returned to its usual position.

When the time comes to permanently repair the broken fibers 10 of cable 2 and there is not enough slack in it to bridge the gap caused or created by the damaged portion—presently and temporarily occupied by cable 31—a spare length of cable 35 has to be permanently inserted to take the place of cable 31. Such is done as follows: Spare cable length 35 is cut to a predetermined length and ends stripped in the manner described for cable ends 2. One terminal end portion is anchored in one cable anchoring means 32 in one frame and the other terminal end portion anchored in anchoring means 32 of the other frame. In both frames, cable anchoring means 11 and 32 are fixedly attached to mounting means 33, which is removably attached to the bottom portion of 34 frame 8. Traffic on a given temporarily repaired fiber is transferred to one or more other fibers and one of the mounting means 33 is then transferred to a permanent splicing means. Thereafter the bare fiber adapter is removed from fiber 10 and a preselected fiber of the spare length of cable is permanetly affixed thereto. Mounting means 32 is then repositioned in frame 8 from whence it came and the process repeated employing the other mounting means and the other end of optical fiber 10 and the optical fiber in spare cable length 35 to which the first mentioned end of optical fiber 10 was permanently affixed thereto. Each fiber in cable 2 is then treated in the same manner including covering the repaired portions with a suitable jacket in a manner well known in the art and the cable reburied or remounted as the case may be.

Figure 7:
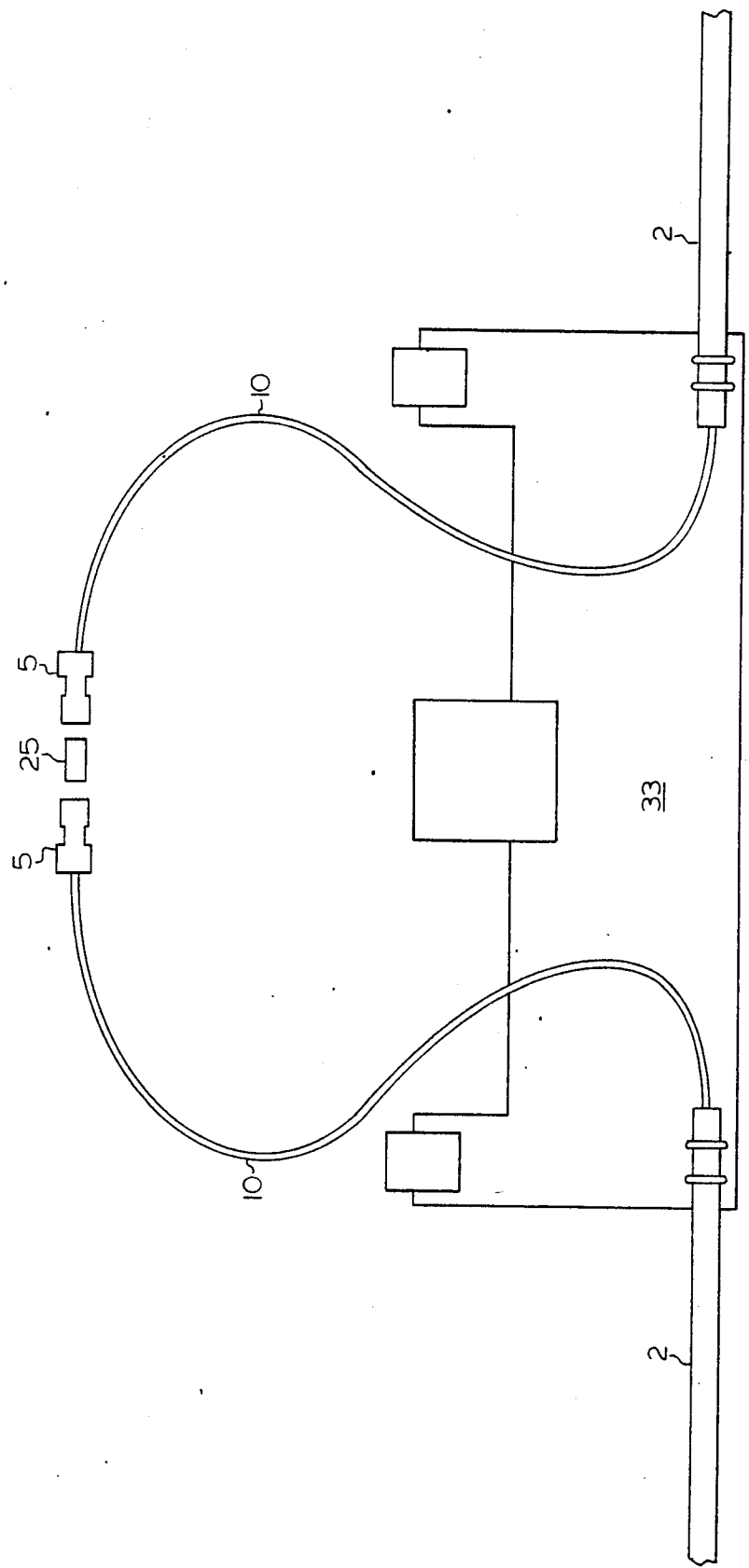
FIG. 7 is a schematic plan view representation of apparatus employed in an alternative method of cable repair.

Reference is now made to FIG. 7: Here schematically shown is apparatus used to perform still another method of quick repair of a broken fiber optic cable. This method is a species of the method previously described. Instead of using frame 8 with a predetermined number of optical fiber connectors 4 mounted thereon, mounting means 33, at least two bare fiber adapters and a sleeve 25 are used. This procedure is primarily adapted to be used in those instances when there is enough slack in cable 2 at the break point so that a connection can be made without a cable insert, e.g., spare length of cable, element 35.

Figure 6:
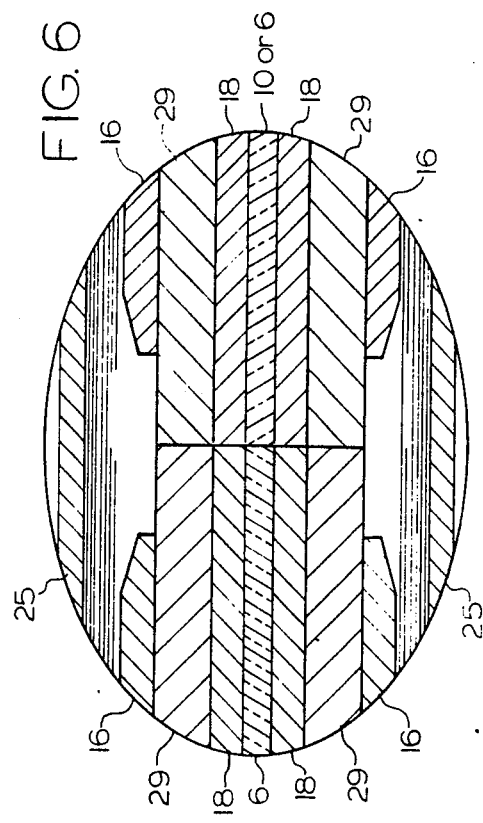
FIG. 6 is an exploded view of the abutting terminal free edges of the alignment and capillary tubes of the bare fiber adapter of FIGS. 3 or 4 and optical fiber connector means of FIG. 2 showing the terminal free edges of an optical fiber in mechanical abutting coaxial relationship forming an optical connection.

The method is as follows: First cable 2 ends are prepared and fiber ends cleaned as previously described. Both prepared ends are affixed to mounting means 33 by means of cable anchoring means 32 or 11. Bare fiber adapters 5 are secured to the two terminal portions of each fiber end 10 in the same manner as shown in FIG. 3. Subsequently, the two bare fiber adapters 4 are joined, one to another by means of a sleeve 25 in the same manner a bare fiber adapter 5 is connected to an optical connector 4. See FIG. 5 for example. It will be noted that the left-hand terminal portion of the optical connector 4 of FIG. 2 is essentially identical in structure to the left-hand terminal portion of the bare fiber adapter 5 of FIGS. 3 and 4. When bare fiber adapter 5 is coaxially joined to optical connector 4 by means of sleeve 25 fitting in or threaded to the sidewalls 14 of annulus 15, a mechanical connection is accomplished like that shown in FIG. 6. When one bare fiber adapter is connected to another bare fiber adapter by a sleeve 25, the connection is identically the same as shown in FIG. 6, except that element 6 on the left-hand side of this figure is now element 10 as would be expected. In such an event, both ends of fiber 10 protruding (element 28) from their respective bare fiber adapter 5 push back the opposing fiber 10 in the other abutting bare fiber adapter causing in both an undulation of fiber 10 in accumulation chamber as previously described. Once this procedure has been accomplished, the "quick repair" is complete, traffice can be resumed and fiber 10 is now ready to be permanently joined in a known prior art manner as above described, e.g., elements 5 are removed and fiber ends 10 are permanently spliced together. The permanently spliced fibers can be permanently stored affixed to element 33 if desired, even after a closure means is disposed around the splice points. The above described procedure is faster than the one using frame 8, but is limited to those instances where there is sufficient slack in the damaged cable at the break point to permit such procedure.

Although the invention has been described in considerable detail, such detailed description is only for the purpose of illustrating specific embodiments. It is evident that variations and modifications can be made from those described without departing from the spirit and scope of the invention.

What is claimed is:

1. A device for making a temporary connection between the terminal free ends of optical fibers of a fiber optic cable comprising:
   (a) a frame containing a cross member;
   (b) an optical fiber connector means mounted on said cross member the longitudinal axis of said cross member being essentially perpendicular with the like axis of said optical fiber connector means;
   (c) an optical fiber of a predetermined length having two terminal portions, one of which is received in and fixedly secured to said optical fiber connector means; and,
   (d) an anchor means to anchor a cable attached to said frame.

2. A device as described in claim 1 including a bracket means attached to the frame between said anchor means and said optical fiber connector means.

3. A device as described in claim 1 including a second frame containing a cross member and an optical fiber connector means relative thereon, the longitudinal axis of said cross member being essentially perpendicular with the like axis of said optical fiber connector means, to which there is secured the remaining optical fiber terminal portion.

4. A device as described in claim 3 wherein said second frame contains a means for anchoring a cable attached to it and a bracket means, said last mentioned bracket means being attached to the second frame between the second mentioned anchor means and the second mentioned optical fiber connector means.

5. A device as described as in claim 1 or 3 containing an additional anchoring means in each frame.

6. A device as described in claim 1 wherein said fiber optic connector means contain an alignment tube and a shell, said alignment tube coaxially received in and a terminal portion thereof spaced apart from the inner surface of said shell forming an annulus.

7. A device as described in claim 6 wherein said fiber optic connector means includes a capillary tube, coaxially received in said alignment tube.

8. A device as described in claim 7 wherein a terminal portion of one of the optical fibers is fixedly and coaxially received in said capillary tube.

9. A device as described in claim 6, wherein said alignment tube protrudes beyond the terminal free edge of said annulus.

10. A device as described in claim 1 wherein said anchoring means is/are removably attached to their respective frames.

11. A bare fiber adapter for temporarily securing the terminal portion of an optical fiber comprising:
    (a) a shell;
    (b) an alignment tube adapted to receive an optical fiber coaxially disposed in said shell, a terminal portion of said alignment tube spaced apart from the inner surface of said shell forming an annulus there between; and,
    (c) means affixed to the terminal portion of said shell opposite from said annulus for removably securing an optical fiber in said bare fiber adapter.

12. A bare fiber adapter as in claim 11 wherein the means for removably securing an optical fiber is a threaded member, threadably engaged to said shell.

13. A bare fiber adapter as in claim 12 wherein the inner-most surface of the portion of the shell forming a part of the annulus is threaded.

14. A bare fiber adapter of claim 13 wherein a terminal portion of said alignment tube protrudes beyond the free edge of said shell and said alignment tube is in communication with an accumulation chamber having a diameter in excess of the diameter of the interior of said alignment tube.

15. A method of joining a first set of optical fibers to a second set of optical fibers comprising:
    (a) providing first and second frames, each containing a cross member on which there are mounted a predetermined number of optical fiber connectors in a predetermined spaced apart manner and a like number of optical fibers, a terminal portion of each of said fibers being received in and fixedly attached to one of the optical fiber connectors of said first frame and the remaining terminal portions of each such fibers likewise received in and fixedly attached to one of the optical connectors of said second frame, thereby providing an optical path from one optical fiber connector means of one frame to another optical fiber connector means of the other frame;
    (b) removably securing a bare fiber adapter to each of the terminal portions of the first and second sets of optical fibers sought to be optically joined one to another; and
    (c) completing an optical path from an optical fiber of the first set to an optical fiber of the second set for each of the fibers in said sets by removably securing together the bare fiber adapters of the first and second sets in abutting coaxial relationship with the fiber optic connectors of the first and second frames respectively.

16. A method as in claim 15 including the step of removing the optical fibers of the first and second sets from their respective bare fiber adapters and fixedly securing one to the other in a predetermined fixed manner.

17. A method as in claim 15 wherein the securing of step (c) is accomplished at least in part by a sleeve member in which a terminal portion of each bare fiber adapter is removably received.

18. A method of joining a first set of optical fibers to a second set of optical fibers comprising:
   (a) providing a mounting member and securing thereto said first and second set of optical fibers sought to be joined together in opposing relationship;
   (b) removably securing a bare fiber adapter to each of the terminal portions of the first and second sets of optical fibers sought to be optically joined one to another; and
   (c) completing an optical path from an optical fiber of the first set to an optical fiber of the second set for each of the fibers in said sets by removably securing together the bare fiber adapters of the first set in abutting coaxial relationship with the bare fiber adapters of the second set.

19. A method as in claim 18 including the step of removing the optical fibers of the first and second sets from their respective bare fiber adapters and fixedly securing one to the other in a predetermined fixed manner.

20. A method as in claim 18 wherein the securing of step (c) is accomplished at least in part by a sleeve member in which a terminal portion of each bare fiber adapter is removably received.

* * * * *

UNITED STATES PATENT OFFICE
CERTIFICATE OF CORRECTION

Patent No. 4,699,460            Dated October 13, 1987

Inventor(s)      Otto I. Szentesi

It is certified that error appears in the above-identified patent and that said Letters Patent are hereby corrected as shown below:

In Claim 3, third line thereof, delete the word "relative".

Signed and Sealed this

Twenty-ninth Day of March, 1988

Attest:

DONALD J. QUIGG

Attesting Officer          Commissioner of Patents and Trademarks